(12) United States Patent
Schlueter

(10) Patent No.: US 10,883,448 B2
(45) Date of Patent: Jan. 5, 2021

(54) SOLID ROCKET MOTOR WITH VORTEX INDUCING FEATURE

(71) Applicant: Aerojet Rocketdyne, Inc., Sacramento, CA (US)

(72) Inventor: Samuel Steven Schlueter, Folsom, CA (US)

(73) Assignee: AEROJET ROCKETDYNE INC., Rancho Cordova, CA (US)

(*) Notice: Subject to any disclaimer, the term of this patent is extended or adjusted under 35 U.S.C. 154(b) by 296 days.

(21) Appl. No.: 15/571,270

(22) PCT Filed: Jul. 26, 2016

(86) PCT No.: PCT/US2016/043982
§ 371 (c)(1),
(2) Date: Nov. 2, 2017

(87) PCT Pub. No.: WO2017/027198
PCT Pub. Date: Feb. 16, 2017

(65) Prior Publication Data
US 2018/0112627 A1    Apr. 26, 2018

Related U.S. Application Data

(60) Provisional application No. 62/202,703, filed on Aug. 7, 2015.

(51) Int. Cl.
*F02K 9/18* (2006.01)
*F02K 9/34* (2006.01)
*F02K 9/08* (2006.01)
*F02K 9/16* (2006.01)
*F02K 9/10* (2006.01)
(Continued)

(52) U.S. Cl.
CPC ............ *F02K 9/34* (2013.01); *B64G 1/403* (2013.01); *F02K 9/08* (2013.01); *F02K 9/10* (2013.01); *F02K 9/16* (2013.01); *F02K 9/18* (2013.01); *F02K 9/24* (2013.01); *F05D 2240/127* (2013.01); *F05D 2250/25* (2013.01)

(58) Field of Classification Search
CPC ...... F02K 9/08; F02K 9/10; F02K 9/16; F02K 9/18; F02K 9/72; B64G 1/403
See application file for complete search history.

(56) References Cited

U.S. PATENT DOCUMENTS 2,661,692 A    12/1953  Vegren
2,920,443 A *  1/1960  Higginson ............... F02K 9/18
                                                  60/253
(Continued)

FOREIGN PATENT DOCUMENTS

DE    2912873       10/1980
FR    2234465 A1 *  1/1975 ............... F02K 9/18

OTHER PUBLICATIONS

Kim, Dohun; Vortex generation using fin-slot structures and a submerged nozzle at a wall-injected cylinder, 2013,Advanced Propulsion Technology Center, The 4th R&D Institute, Agency for Defense Development, Daejeon, Republic of Korea (Year: 2013).*

(Continued)

*Primary Examiner* — Todd E Manahan
*Assistant Examiner* — Kyle Robert Thomas

(57) ABSTRACT

A solid rocket motor includes a propellant grain structure defining an axial bore and a vortex inducing feature.

5 Claims, 2 Drawing Sheets

(51) Int. Cl.
*B64G 1/40* (2006.01)
*F02K 9/24* (2006.01)

(56) References Cited

U.S. PATENT DOCUMENTS

| | | | | |
|---|---|---|---|---|
| 2,933,041 | A * | 4/1960 | Ambrose | F02K 9/10 60/39.47 |
| 3,393,517 | A * | 7/1968 | Altman | F02K 9/26 60/207 |
| 3,779,819 | A * | 12/1973 | Thomas | F02K 9/10 149/2 |
| 3,822,645 | A | 7/1974 | Alexander | |
| 5,367,872 | A * | 11/1994 | Lund | F02K 9/14 102/288 |
| 6,431,072 | B1 * | 8/2002 | Archer, Jr. | C06B 21/0058 102/284 |
| 8,350,199 | B2 * | 1/2013 | Kibens | B64G 1/002 244/3.1 |
| 8,465,607 | B1 * | 6/2013 | Kelley | F02K 9/18 149/87 |
| 8,776,526 | B2 * | 7/2014 | Chen | F02K 9/26 60/219 |
| 9,038,368 | B2 * | 5/2015 | Fuller | F02K 9/12 60/255 |
| 2002/0062756 | A1 * | 5/2002 | Archer, Jr. | C06B 21/0058 102/292 |
| 2011/0203256 | A1 * | 8/2011 | Chen | F02K 9/26 60/251 |
| 2013/0031888 | A1 * | 2/2013 | Fuller | F02K 9/12 60/255 |

OTHER PUBLICATIONS

International Search Report for International Patent Application No. PCT/US2016/046982 completed Oct. 25, 2016.
International Preliminary Report on Patentability for International Application No. PCT/2016/043982 dated Feb. 2, 2018.

* cited by examiner

SOLID ROCKET MOTOR WITH VORTEX INDUCING FEATURE

CROSS-REFERENCE TO RELATED APPLICATIONS

The present disclosure claims priority to U.S. Provisional Patent Application No. 62/202,703, filed Aug. 7, 2015.

BACKGROUND

Solid rocket motors typically include a solid propellant grain material that is cast around a core. The core is then removed by sliding it out from the cast grain material, leaving an open central bore. Ignition at the bore surface of the solid propellant generates high pressure gas, which is expelled from the bore through a nozzle to generate thrust.

SUMMARY

A solid rocket motor according to an example of the present disclosure includes a propellant grain structure defining an axial bore and a vortex inducing feature.

In a further embodiment of any of the foregoing embodiments, the vortex inducing feature has a radial component and is asymmetric to a radial cross section of the structure.

In a further embodiment of any of the foregoing embodiments, the vortex inducing feature has a helical component relative the axial bore.

In a further embodiment of any of the foregoing embodiments, the vortex inducing feature is a plurality of off-radial slots.

In a further embodiment of any of the foregoing embodiments, each of the off-radial slots includes an open end at the axial bore and a closed end distal from the axial bore, and the closed end is circumferentially offset from the open end.

In a further embodiment of any of the foregoing embodiments, each of the off-radial slots defines a central axis that is non-intersecting with a central axis of the axial bore.

In a further embodiment of any of the foregoing embodiments, the vortex inducing feature includes a plurality of helical slots.

In a further embodiment of any of the foregoing embodiments, the propellant grain structure defines a central axis (A) and the axial bore defines a central axis (A2) that is offset from the central axis (A).

In a further embodiment of any of the foregoing embodiments, the vortex inducing feature includes at least one protuberance that projects into the axial bore.

In a further embodiment of any of the foregoing embodiments, the protuberance extends along the axial bore.

In a further embodiment of any of the foregoing embodiments, the protuberance is helical.

In a further embodiment of any of the foregoing embodiments, the axial bore has a non-axisymmetric cross-section at the at least one protuberance.

A further embodiment of any of the foregoing embodiments includes a motor case in which the propellant grain structure is disposed. The motor case has an inwardly extending portion that has the at least one vortex inducing feature.

A method according to an example of the present disclosure includes burning a propellant grain structure in a solid rocket motor. The propellant grain structure defines an axial bore for flow of combustion materials. A vortex flow of the combustion materials is generated in the axial bore using at least one vortex inducing feature.

A further embodiment of any of the foregoing embodiments includes reducing the vortex flow by burning or eroding the vortex inducing feature during the burning.

In a further embodiment of any of the foregoing embodiments, the vortex flow is about a central axis (A2) of the axial bore.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

In solid rocket motors particles of solid propellant material are released into an axial bore where they react with oxygen to generate high heat and pressure gas. The reactants, such as the oxygen and the solid propellant material, and the products of combustion are generally referred to herein as combustion materials. The particles tend to flow and concentrate along the center region of the bore. Oxygen along the center region of the bore is thus rapidly consumed by reaction with the particles, thus reducing oxygen concentration levels. Inversely, in the region near the outer walls of the bore, the concentration of particles is lower in comparison to the center of the bore, and there may thus be higher oxygen concentration than in the center region. As will be described herein, this disclosure relates to features that promote mixing/distribution of particles in the bore, to enhance contact with oxygen and improve combustion efficiency.

Figure 1:
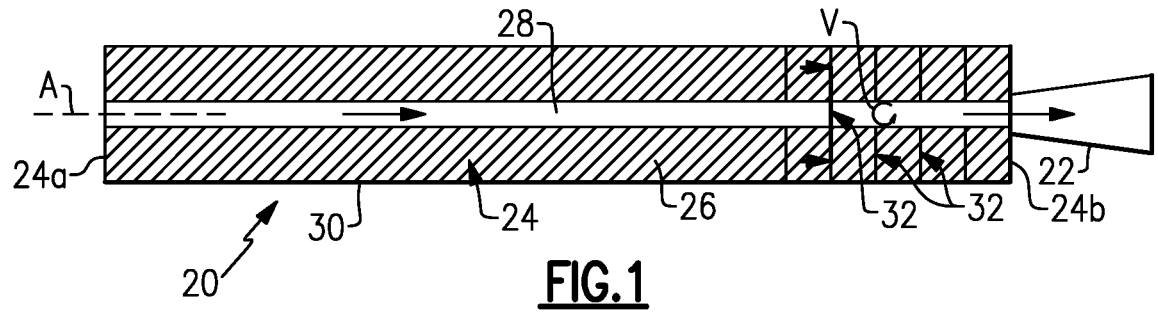
FIG. 1 illustrates an example of a solid rocket motor.

FIG. 1 schematically illustrates a cross-section of selected portions of an example solid rocket motor 20. The solid rocket motor 20 generally includes a nozzle 22 and a solid propellant section 24. In the example shown, the solid propellant section 24 includes a forward end 24a and an aft end 24b. The aft end 24b is in communication with the nozzle 22. As will be appreciated, the solid rocket motor 20 may include additional components related to the operation thereof, which are generally known and thus not described herein.

The solid propellant section 24 includes a solid propellant grain structure 26 (hereafter "structure 26"). As an example, the structure 26 is formed of a solid propellant grain material. The solid propellant grain material is not particularly limited. Typically, the solid propellant grain material includes a binder and a solid energetic, such as aluminum metal. The solid propellant grain material is molded or otherwise formed into a shape, which constitutes the structure 26. The structure 26 defines an elongated axial bore 28. The structure 26 is generally disposed within a motor case 30 about a central axis A.

Upon ignition the solid energetic reacts (e.g., burns with oxygen) to produce high temperature and high pressure gas (combustion gas). The combustion gas causes release of particles of the solid energetic from the structure 26 into the bore 28. The particles react to produce additional combustion gas. The combustion gas flows down the bore 28 and discharges through the nozzle 22 to produce thrust.

The rocket motor 20 includes at least one vortex inducing feature 32 that is configured, for example, to generate a vortex flow (V) in the bore 28. The vortex flow V may reduce particle collisions along the central region of the bore 28, redistribute particles to oxygen-rich radially outer regions of the bore 28, and increase flow path length of the particles, each of which may enhance combustion efficiency.

Figure 2:
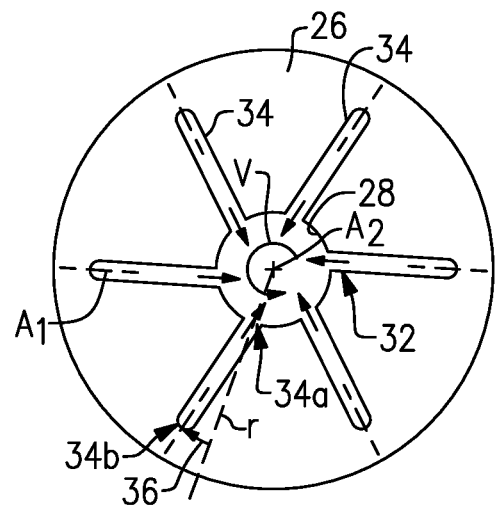
FIG. 2 illustrates an example of a vortex inducing feature including off-radial slots.

FIG. 2 shows a cross-section through a portion of the structure 26. In this example, the structure 26 defines a plurality of off-radial slots 34 that together provide or constitute the vortex inducing feature 32. Each of the off-radial slots 34 has a central axis $A_1$ and includes an open end 34a at the bore 28 and a closed end 34b that is distal from the bore 28. The closed end 34b is circumferentially offset, as represented at 36, from the open end 34a such that the slots 34 and bore 28 form a "pinwheel" type shape. For instance, the circumferential offsets 36 are equivalent in magnitude and are in a common circumferential direction, i.e., clockwise or counter-clockwise with respect to the central axis $A_2$. Thus, the central axes $A_1$ deviate from a pure radial direction (r) with regard to a central axis $A_2$ of the bore 28 such that the central axes $A_1$ of the slots 34 are non-intersecting with the central axis $A_2$ of the bore 28 (which in this example is co-axial with the central axis A of the structure 26).

In the illustrated example, the central axes $A_1$ are substantially linear. Alternatively, the central axes $A_1$ could be rectilinear, curved, or combinations thereof, as long as the direction of the central axis $A_1$ at the open end 34a is non-intersecting with the central axis $A_2$.

Upon ignition the surfaces of the structure 26 within the slots 34 release a flow of particles of solid energetic and combustion gas. The slots 34 direct that flow radially inwardly toward the bore 28 with a tangential velocity. Because the slots 34 deviate from the pure radial direction, the ejection of the flow from the slots 34 in to the bore 28 produces a vortex flow (V) about the central axis $A_2$ of the bore 28. The vortex flow centrifugally drives at least a portion of the particles of energetic material toward the oxygen-rich, radially outer region of the bore 28. Thus, the tendency of the particles to concentrate along the central region of the bore 28 is reduced, to enhance combustion efficiency.

Figure 3:
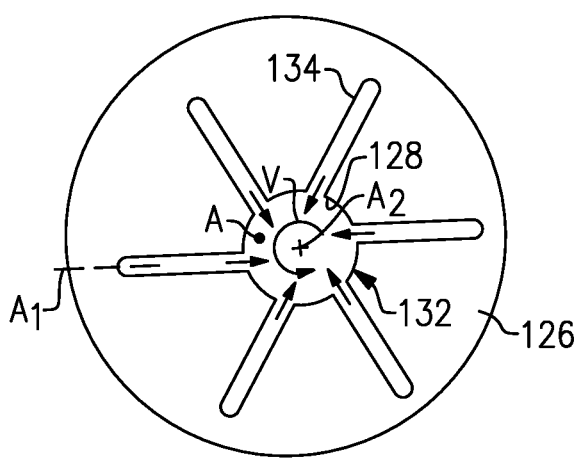
FIG. 3 illustrates another example of a vortex inducing feature including an off-center bore.

FIG. 3 illustrates another example structure 126 and vortex inducing feature 132. The structure 126 defines an elongated axial bore 128 and slots 134 that extend off of the bore 128. In this disclosure, like reference numerals designate like elements where appropriate and reference numerals with the addition of one-hundred or multiples thereof designate modified elements that are understood to incorporate the same features and benefits of the corresponding elements. In this example, the slots 134 may be pure radial slots or off-radial slots. The vortex inducing feature 132 is that the bore 128 is off-center with respect to the central axis A of the structure 126. That is, the central axis $A_2$ of the bore 128 is offset from the central axis A of the structure 126 (i.e., non-coaxial). In this regard, the central axes $A_1$ of the slots 134 are non-intersecting with the central axis $A_2$ of the bore 128. In a further example, the central axes $A_1$ of the slots 134 are intersecting with the central axis A of the structure 126. Thus, the flow of particles and combustion gas discharged from the slots 134 into the bore 128 produce a vortex flow (V) about the central axis $A_2$ of the bore 128.

Figure 4:
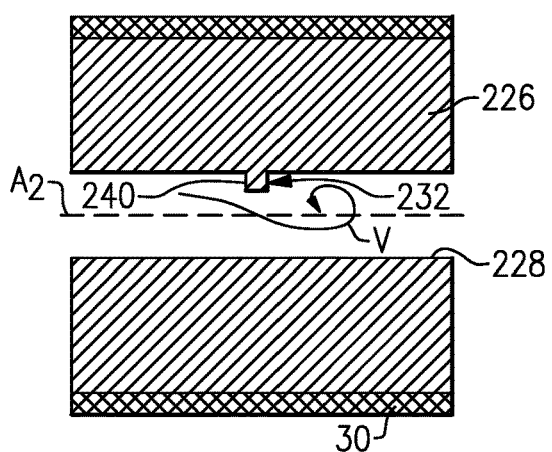
FIG. 4 illustrates another example of a vortex inducing feature including a protuberance formed or solid propellant grain material that projects into the bore.

FIG. 4 shows a representative portion of another example of a structure 226 and vortex inducing feature 232. In this example, the vortex inducing feature 232 is a protuberance 240 that projects radially into the bore 228, i.e., the protuberance has a radial component. The protuberance 240 may have an aerodynamic shape to more efficiently alter or direct flow in the bore 228. The protuberance 240 is integrally formed with the structure 226 and is thus formed of the solid propellant grain material. The cross-section of the bore 228 at the protuberance 240 is non-axisymmetric with respect to the central axis $A_2$ of the bore 228. That is, the protuberance 240 is asymmetric to a radial cross section of the structure 226. The protuberance 240 thus disrupts flow along the bore 228 to produce a vortex flow V about the axis $A_2$ downstream of the protuberance 240. As will be appreciated, the structure 226 may include additional protuberances 240 that are axially spaced along the bore 228. Additionally, the protuberances 240 may be located at different circumferential positions around the bore 228, to further promote vortex formation, mixing, and distribution of the particles. Additionally, since the protuberance 240 is formed of the solid propellant grain material, the protuberance 240 is consumed during burning. Therefore, the effect of the vortex flow is greatest during an early portion of the burn of the rocket motor 20 and diminishes as the protuberance burns away, which reduces potential for roll torque after the early burn.

Figure 5:
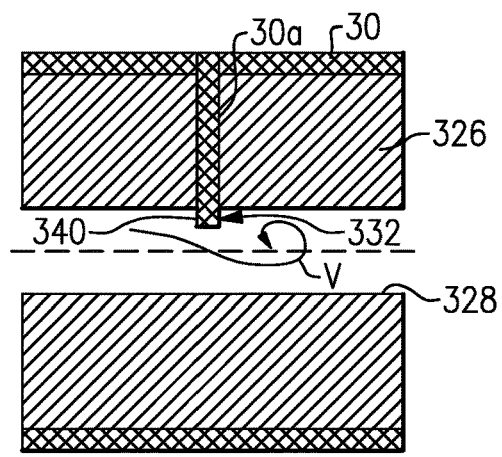
FIG. 5 illustrates another example of a vortex inducing feature including a protuberance formed of non-energetic material.

FIG. 5 shows a representative portion of another example vortex inducing feature 332. In this example, the vortex inducing feature 332 is also a protuberance 340 that projects into the bore 328. However, rather than being formed integrally with the propellant grain structure 326, the protuberance 340 is formed of an inert or non-energetic material. For example, the protuberance 340 is a portion of the motor case 30. In this example, the motor case 30 includes an inwardly extending portion 30a that includes the protuberance 340 that protrudes into the bore 328. Similar to the protuberance 240, the protuberance 340 disrupts flow along the bore 328 to form a vortex flow V downstream of the protuberance 340. Unlike the protuberance 240, the protuberance 340 is not formed of the solid propellant grain material. However, in one further example, the protuberance 340 is formed of an ablative material that erodes during an early portion of the burn of the rocket motor 20. The protuberance 340 thus diminishes and reduces potential for roll torque after the early burn.

Figure 6:
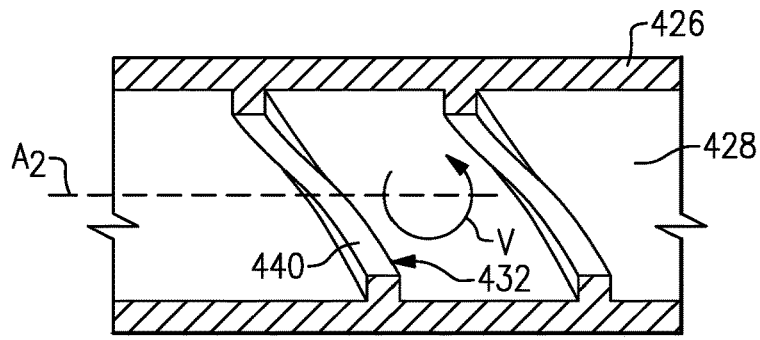
FIG. 6 illustrates another example of a vortex inducing feature including helical protuberances.

FIG. 6 illustrates another example of a vortex inducing feature 432. In this example, the flow perturbation feature 432 is a protuberance 440 that is formed integrally with the structure 426. The protuberance 440 has a helical component relative the bore 428. For instance, the protuberance 440 has a helical shape that extends about the central axis $A_2$ of the bore 428. Alternatively, the protuberance 440 or sections of the protuberance 440 could be formed of the ablative material rather than the solid propellant grain material. As the particles and combustion gas flow along the bore 428, the helical protuberance 440 swirls the flow to produce a vortex flow (V) about the central axis $A_2$. As described above, the protuberance 440 may be consumed or may be eroded during an early portion of the burn of the rocket motor 20.

Figure 7:
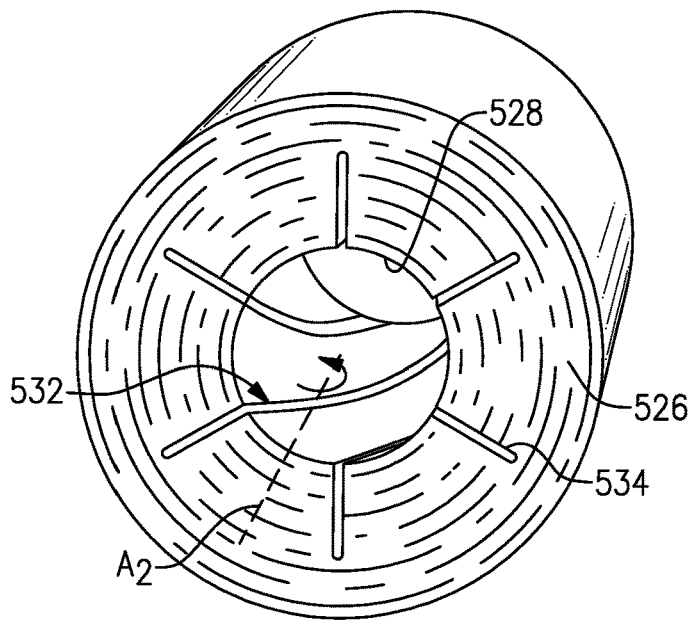
FIG. 7 illustrates another example of a vortex inducing feature including helical slots.

FIG. 7 illustrates another example structure 526 and vortex inducing feature 532. In this example, the vortex inducing feature 532 includes helical slots 534. The helical slots 534 each form a helix shape about the central axis $A_2$ of the bore 528. The particles and combustion gas discharged from the slots 534 thus swirls around the central axis $A_2$ of the bore 528 to produce a vortex flow (V).

The examples herein also represent a method that includes burning the propellant grain structure 26/126/226/326/426/526 in the solid rocket motor 20 and generating a vortex flow (V) of the combustion materials in the bore 28/128/228/328/428/528 using at least one vortex inducing feature 32/132/232/332/432/532. As described, the method may further include reducing the vortex flow by burning or eroding the vortex inducing feature 32/132/232/332/432/532 during the burning.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method comprising: burning a propellant grain structure in a solid rocket motor, the propellant grain structure defines an axial bore for flow of combustion materials and defines a propellant grain central axis (A), and the axial bore defines an axial bore central axis ($A_2$) that is offset from, and parallel to, the propellant grain central axis (A); and generating a vortex flow of the combustion materials in the axial bore using a vortex inducing feature that includes a plurality of linear off-radial slots each defining a central axis that is non-intersecting with the axial bore central axis ($A_2$), the linear off-radial slots are evenly distributed around the axial bore so as to form a pinwheel shape in which respective opens ends of the linear off-radial slot at the axial bore are uniformly spaced around the axial bore and respective closed ends of the linear off-radial slots are circumferentially offset by an angle from a respective radial axis passing through the axial bore central axis ($A_2$) and the corresponding open end, wherein each closed end is circumferentially offset in the same circumferential direction, the linear off-radial slots upon burning of the propellant grain structure directing flow of particles of solid energetic and combustion gas radially inwardly toward the axial bore such that ejection of the flow in to the axial bore produces a vortex flow about the axial bore central axis ($A_2$).

2. A solid rocket motor comprising:
a propellant grain structure defining an axial bore; and
a vortex inducing feature including a plurality of linear off-radial slots each defining a central axis that is non-intersecting with an axial bore central axis ($A_2$), the linear off-radial slots being evenly distributed around the axial bore so as to form a pinwheel shape in which respective open ends of the linear off-radial slot at the axial bore are uniformly spaced around the axial bore and respective closed ends of the linear off-radial slots are circumferentially offset by an angle from a respective radial axis passing through the axial bore central axis ($A_2$) and the corresponding open end, wherein each closed end is circumferentially offset in the same circumferential direction.

3. The solid rocket motor as recited in claim 2, wherein propellant grain structure defines a propellant grain central axis (A), and the axial bore central axis ($A_2$) is offset from, and parallel to, the central axis (A).

4. The solid rocket motor as recited in claim 2, wherein the linear off-radial slots have opposed parallel straight sides.

5. The solid rocket motor as recited in claim 2, wherein, upon burning of the propellant grain structure in the linear off-radial slots, the linear off-radial slots direct flow of particles of solid energetic and combustion gas radially inwardly toward the axial bore such that ejection of the flow in to the axial bore produces a vortex flow about the axial bore central axis ($A_2$).

* * * * *